(12) United States Patent
Bharadwaj et al.

(10) Patent No.: US 11,009,863 B2
(45) Date of Patent: May 18, 2021

(54) SYSTEM AND METHOD FOR ADDITIVE MANUFACTURING PROCESS MONITORING

(71) Applicant: HONEYWELL INTERNATIONAL INC., Morris Plains, NJ (US)

(72) Inventors: Raj Mohan Bharadwaj, Maple Grove, MN (US); Andrew Peter Vechart, Minnetrista, MN (US); Suresh Sundarraj, West Richland, WA (US); Piyush Ranade, Minneapolis, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 117 days.

(21) Appl. No.: 16/008,621

(22) Filed: Jun. 14, 2018

(65) Prior Publication Data

US 2019/0384274 A1 Dec. 19, 2019

(51) Int. Cl.
*G05B 23/02* (2006.01)
*B22F 3/105* (2006.01)
(Continued)

(52) U.S. Cl.
CPC .......... *G05B 23/0281* (2013.01); *B22F 10/00* (2021.01); *G05B 13/027* (2013.01);
(Continued)

(58) Field of Classification Search
CPC ............ G05B 23/0283; G05B 23/0281; G05B 13/027; G05B 2219/25255; B22F 3/1055; B22F 2003/1057; B33Y 50/02
See application file for complete search history.

(56) References Cited

U.S. PATENT DOCUMENTS 9,108,358 B1 8/2015 Herloski et al.
9,308,690 B2 4/2016 Boyer et al.
(Continued)

FOREIGN PATENT DOCUMENTS

CN 105619818 A 6/2016
CN 207205270 U 4/2018

OTHER PUBLICATIONS

Rao, P.K., et al; Online Real-Time Quality Monitoring in Additive Manufacturing Processes Using Heterogeneous Sensors; Journal of Manufacturing Science and Engineering; vol. 137, Issue 6; Retrieved from Internet [[https://manufacturingscience.asmedigitalcollection.asme.org/article.aspx?articleid=2469630]] Apr. 12, 2018.
(Continued)

*Primary Examiner* — Robert E Fennema
*Assistant Examiner* — Jonathan Michael Zkrzycki
(74) *Attorney, Agent, or Firm* — Lorenz & Kopf, LLP (57) ABSTRACT

A computer-implemented method for predicting material properties in an Additive Manufacturing (AM) process is provided. The method comprises: receiving sensor data during the build of a metallic component using the AM process wherein the sensor data includes time-series temperature data of a surface of the metallic component recorded by a photodiode and time-series temperature data of a surface of the metallic component recorded by a pyrometer; receiving ICME (Integrated Computational Materials Engineering) model output data for building the component wherein the ICME model output data includes predicted melt pool dimensions time-series data, predicted melt temperature time-series data, and predicted defects forming as a result of melt pool evolution and movement; and estimating using the received sensor data and the received ICME model output data one or more material properties associated with the metallic component using a
(Continued)

material property prediction module configured to predict one or more of the material properties.

20 Claims, 3 Drawing Sheets

(51) Int. Cl.
*G05B 13/02* (2006.01)
*B33Y 50/02* (2015.01)
*B22F 10/00* (2021.01)
*B22F 10/10* (2021.01)

(52) U.S. Cl.
CPC .......... *G05B 23/0283* (2013.01); *B22F 10/10* (2021.01); *B33Y 50/02* (2014.12); *G05B 2219/25255* (2013.01)

(56) References Cited

U.S. PATENT DOCUMENTS

| | | | |
|---|---|---|---|
| 9,724,876 B2 | 8/2017 | Cheverton et al. | |
| 9,846,427 B2 | 12/2017 | Straub et al. | |
| 2015/0177158 A1 | 6/2015 | Cheverton | |
| 2016/0176114 A1 | 6/2016 | Tsai et al. | |
| 2016/0184893 A1* | 6/2016 | Dave | B33Y 10/00 419/53 |
| 2016/0185048 A1* | 6/2016 | Dave | B33Y 50/02 700/119 |
| 2016/0193790 A1 | 7/2016 | Shuck et al. | |
| 2016/0236414 A1 | 8/2016 | Reese et al. | |
| 2017/0001379 A1 | 1/2017 | Long | |
| 2017/0038342 A1 | 2/2017 | Clavette et al. | |
| 2017/0057170 A1 | 3/2017 | Gupta et al. | |
| 2017/0138906 A1 | 5/2017 | Hartwig et al. | |
| 2017/0232515 A1 | 8/2017 | DeMuth et al. | |
| 2017/0266762 A1 | 9/2017 | Dave et al. | |
| 2017/0297095 A1 | 10/2017 | Zalameda et al. | |
| 2017/0351245 A1 | 12/2017 | Zhang et al. | |
| 2017/0372480 A1* | 12/2017 | Anand | G06F 17/5009 |
| 2018/0036964 A1 | 2/2018 | DehghanNiri et al. | |
| 2018/0079125 A1 | 3/2018 | Perez et al. | |
| 2018/0341248 A1* | 11/2018 | Mehr | G05B 19/4099 |

OTHER PUBLICATIONS

Online quality inspection using Bayesian classification in powder-bed additive manufacturing from high-resolution visual camera images; Mar. 22, 2018; Retrieved from Internet [[https://link.springer.com/article/10.1007%2Fs10845-018-1412-0]] Apr. 12, 2018.

* cited by examiner

SYSTEM AND METHOD FOR ADDITIVE MANUFACTURING PROCESS MONITORING

TECHNICAL FIELD

The present invention generally relates to an additive manufacturing process, and more particularly relates to monitoring an additive manufacturing process in real time for potential faults.

BACKGROUND

Additive manufacturing (AM) involves the manufacture of a structure by the addition of multiple layers of material that combine to create the structure. Selective Laser Melting (SLM) is an AM technique in which a high power-density laser is used to melt and fuse metallic powders together. The technology fuses metal powder into a solid part by melting it locally using a focused laser beam. Parts are built up additively layer by layer, for example, using layers 20 micrometers in thickness.

Integrated Computational Materials Engineering (ICME) models are available for predicting the performance of materials during part manufacture in an AM process. The available ICME models require extensive computational power and may not be performed in real-time or near real-time while a part is being manufactured to provide insight into the build process. The available modeling may not be used to analyze process performance data in real-time to determine if defects may be forming and/or if a process modification is needed to prevent further defect formation.

Hence, it is desirable to provide systems and methods for analyzing an AM process during part manufacture to identify potential faults when they occur. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A computer-implemented method for predicting material properties in an additive manufacturing (AM) process is provided. The method includes receiving sensor data during the build of a metallic component using the AM process. The method further includes receiving ICME (Integrated Computational Materials Engineering) model output data for building the component, wherein the ICME model output data includes predicted melt pool dimensions time-series data, predicted melt temperature time-series data, and predicted defects forming as a result of melt pool evolution and movement. The method includes estimating, using the received sensor data and the received ICME model output data, one or more material properties associated with the metallic component using a material property prediction module configured to predict one or more material properties. The sensor data may include two or more time-series temperature data of a surface of the metallic component recorded by a photodiode, time-series temperature data of a surface of the metallic component recorded by a pyrometer, time-series laser power data, time-series build chamber oxygen data, time-series build chamber humidity data, and other time-series build chamber environmental data.

A computer-implemented system configured to predict material properties in an Additive Manufacturing (AM) process is provided. The system comprises a photodiode configured to provide time-series temperature data of a surface of a metallic component during the build of the metallic component in an AM process; a pyrometer configured to provide time-series temperature data of a surface of the metallic component during the build of the metallic component in an AM process; an ICME (Integrated Computational Materials Engineering) module configured to predict ICME model output data for building the component, wherein the ICME model output data includes predicted melt pool dimensions time-series data, predicted melt temperature time-series data, and predicted defects forming as a result of melt pool evolution and movement; and a material property prediction module configured to estimate, in real-time, during the build of the metallic component, using the time-series temperature data from the photodiode, the time-series temperature data from the pyrometer, and the ICME model output data, one or more material properties of the associated layered evolution of the metallic component.

A material property prediction module configured to predict material properties in an Additive Manufacturing (AM) process, the material property prediction module comprising one or more processors configured by programming instructions in computer readable media. The material property prediction module is configured to: receive sensor data during the build of a metallic component using the AM process, wherein the sensor data includes time-series temperature data of a surface of the metallic component recorded by a photodiode and time-series temperature data of a surface of the metallic component recorded by a pyrometer; receive ICME (Integrated Computational Materials Engineering) model output data for building the component, wherein the ICME model output data includes predicted melt pool dimensions time-series data, predicted melt temperature time-series data, and predicted defects forming as a result of melt pool evolution and movement; and estimate using the received sensor data and the received ICME model output data one or more material properties associated with the metallic component.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: Application Specific Integrated Circuit (ASIC), a Field-Programmable Gate-Array (FPGA), a Graphics Processing Unit (GPU), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
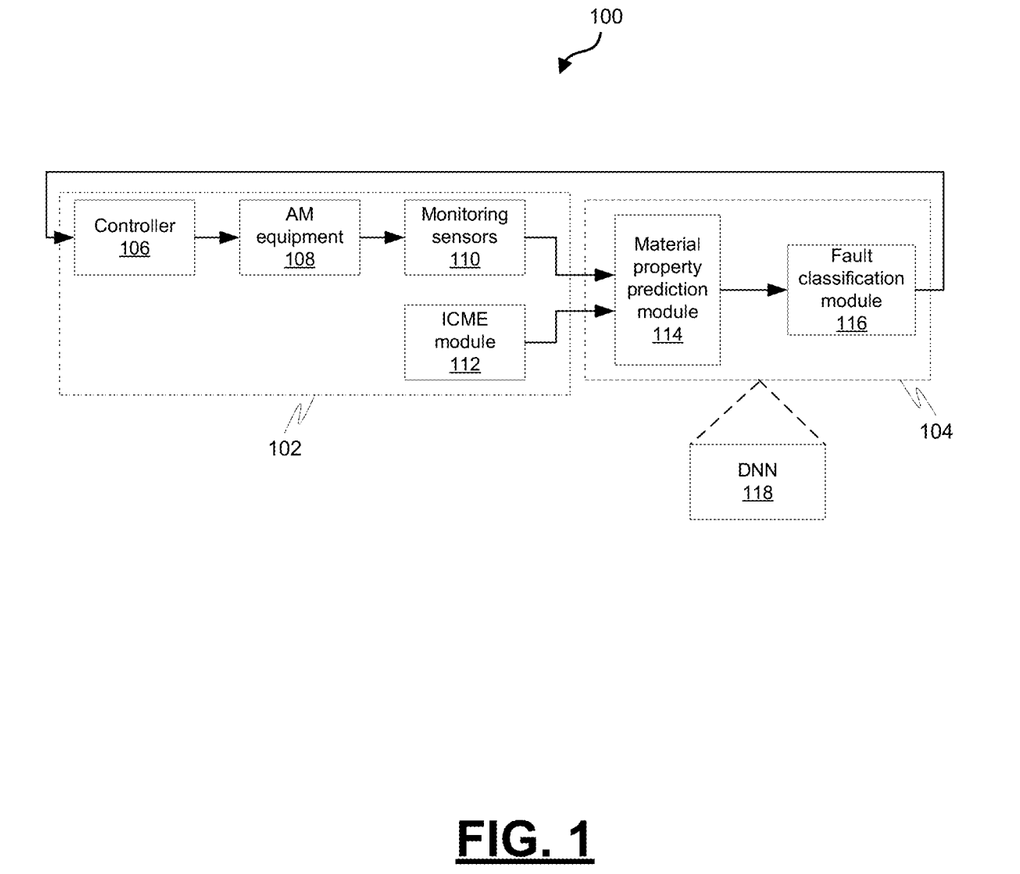
FIG. 1 is a block diagram depicting an example Additive Manufacturing (AM) environment in which a real-time fault prediction module may be implemented, in accordance with some embodiments

FIG. 1 is a block diagram depicting an example Additive Manufacturing (AM) environment 100 in which a real-time fault prediction module may be implemented. The example environment includes a computer-implemented AM system 102 and a computer-implemented fault prediction module 104.

The example computer-implemented AM system 102 is configured to manufacture one or more component part types using an AM process. The example computer-implemented AM system 102 includes a controller 106, AM equipment 108, monitoring sensors 110, and an ICME (Integrated Computational Materials Engineering) module 112 comprising a plurality of ICME models.

The example controller 106 is configured to control a manufacturing process using the AM equipment 108. The example controller 106 includes at least one processor and a computer-readable storage device or media. The processor may be any custom-made or commercially available processor, a Central Processing Unit (CPU), a Graphics Processing Unit (GPU), an Application Specific Integrated Circuit (ASIC) (e.g., a custom ASIC implementing a neural network), a Field Programmable Gate Array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in Read-Only Memory (ROM), Random-Access Memory (RAM), and Keep-Alive Memory (KAM), for example. KAM is a persistent or nonvolatile memory that may be used to store various operating variables while the processor is powered down. The computer-readable storage device or media may be implemented using any of a number of known memory devices such as PROMs (Programmable Read-Only Memory), EPROMs (Electrically PROM), EEPROMs (Electrically Erasable PROM), flash memory, or any other electric, magnetic, optical, or combination memory devices capable of storing data, some of which represent executable instructions, used by the controller. The instructions may include one or more separate programs, each of which comprises an ordered listing of executable instructions for implementing logical functions. The instructions, when executed by the processor, receive and process signals, perform logic, calculations, methods and/or algorithms for controlling the components of the AM equipment 108.

The example AM equipment 108 is configured to manufacture one or more metallic components by building the component from thousands of small layers, one layer at a time, using metal powder and a high power-density laser. The high power-density laser is used to melt and fuse layers of metallic powder together into a solid part by melting the layers of metallic powder using a focused laser beam. Components are built up additively, layer by layer, for example, using layers 20 micrometers in thickness. In the example AM equipment 108, thin layers of atomized fine metal powder are evenly distributed using a coating mechanism onto a substrate plate, usually metal, that is fastened to an indexing table that moves in the vertical (Z) axis. After a layer has been distributed, each 2D slice of the part geometry is fused by selectively melting the powder. This is accomplished with a high-power laser beam, that is directed in the X and Y directions with two high frequency scanning mirrors. The laser energy is intense enough to permit full melting (welding) of the particles to form solid metal. The process is repeated layer after layer until the part is complete.

To monitor the build process, the example monitoring sensors 110 are provided. The example monitoring sensors 110 may include a photodiode configured to provide time-series temperature data of a surface of a metallic component during the build of the metallic component during the AM process and a pyrometer configured to provide time-series temperature data of a surface of the metallic component during the build of the metallic component during in an AM process. The example monitoring sensors 110 may also include sensors configured to provide time-series laser power data, time-series build chamber oxygen data, time-series build chamber humidity data, and other time-series build chamber environmental data.

The example ICME module 112 comprises one or more processors configured by programming instructions in non-transient computer readable media to implement a plurality of ICME models. The ICME models may include multi-scale, multi-physics models that help describe the laser's interaction with the metallic powder. The ICME models may include, on a microscopic level, porosity prediction evaluation, microstructure prediction evaluation, and particle-to-particle melting, coalescence, and fusion effectiveness predictions. On a macroscopic level, the ICME models may include the ability to predict residual stresses in the final build and also constitutive modeling to help understand the kinetics of the sintering and densification process for the manufactured component. The example ICME module 112 is configured to predict ICME model output data for building the component. The ICME model output data may include predicted melt pool dimensions time-series data, predicted melt temperature time-series data, and predicted defects forming as a result of the melt pool evolution and motion. The example ICME module 112 is configured to predict the ICME model output data from inputs including laser power, laser speed, hatch spacing, and laser motion on top of a powder bed. The example ICME module 112 may be accessible via a server (e.g., on the same or a different network). The example ICME module 112 may be accessible as a repository containing all runs with different parameters.

The example computer-implemented fault prediction module 104 includes a material property prediction module 114 configured to predict material property conditions in an AM process and a fault classification module 116 configured to predict fault conditions based on the melted and fused material integrity. The example computer-implemented fault prediction module 104 may be implemented using a Deep Neural Network (DNN) 118. Alternatively, the material property prediction module 114 and the fault classification module 116 could each be implemented by a distinct DNN.

The example material property prediction module 114 comprises one or more processors configured by programming instructions in computer readable media. The example material property prediction module 114 is configured to estimate, in real-time, during the build of the metallic component, using time-series sensor data and the ICME model output data, one or more material properties associated with the metallic component. The example material property prediction module 114 is configured to receive sensor data during the build of a metallic component using the AM process, wherein the sensor data may include two or more of time-series temperature data of a surface of the metallic component recorded by a photodiode, time-series temperature data of a surface of the metallic component recorded by a pyrometer, time-series laser power data, time-series build chamber oxygen data, time-series build chamber humidity data, and other time-series build chamber environmental data; receive ICME model output data for building the component, wherein the ICME model output data includes predicted melt pool dimensions time-series data, predicted melt temperature time-series data, and predicted defects forming as a result of melt pool evolution and movement; and estimate using the received sensor data and the received ICME model output data one or more material properties associated with the formed metallic component. The one or more material properties may include one or more of porosity (size and distribution), surface roughness, strength of a section of the metallic component, residual stresses, and others.

The example fault classification module 116 comprises one or more processors configured by programming instructions in computer readable media. The example fault classification module 116 is configured to predict anomalies during the AM build process of the component based on a departure from nominal of the estimated one or more material properties associated with the formed metallic component.

The example material property prediction module 114 and the example fault classification module 116 are implemented using the example DNN 118. The example DNN 118 can be trained using sensor data from the build of other components and one or more of ICME model output data for the build of the other components and post-build inspection data of the other components. The example DNN 118 is trained through computing and correcting a neural network model for the example material property prediction module 114 and the example fault classification module 116 based on an "error estimator" metric to determine a final weight for each node in the neural network model. The example DNN 118 may include a plurality of DNNs, wherein each DNN of the plurality of DNNs is configured to estimate, using the time-series sensor data, and the ICME model output data, a unique material property associated with the formed metallic component.

Figure 2A:
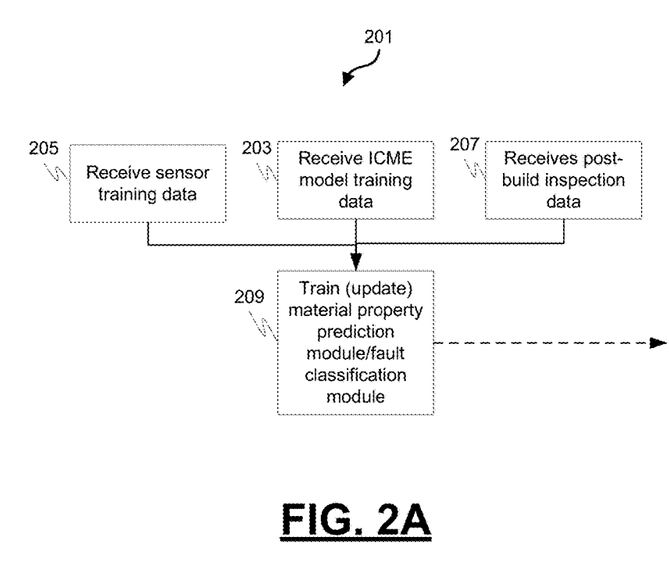
FIG. 2A is a process flowchart depicting an example process for training a material property prediction module and fault classification module, in accordance with some embodiments.

FIG. 2A is a process flowchart depicting an example process 201 for training a material property prediction module and fault classification module. The training is performed offline before the modules are put to use to predict, in real-time, material properties and/or faulty layer(s) built during an AM process.

The example process 201 includes collecting training data comprising sensor data from the build of a component during an AM process (operation 205). The example process 201 also includes collecting training data comprising one or both of ICME model output data for the build of the component (operation 203) and post-build inspection data for the component (operation 207).

The example process 201 includes training and/or updating a material property prediction module and fault classification module (operation 209). Training the material property prediction module and fault classification module includes computing and correcting a neural network model for the material property prediction module and fault classification module based on an error estimator metric to determine a final weight for each node in the neural network model.

As a result of the training, a trained material property prediction module and trained fault classification module will be available for use in an AM process. The trained material property prediction module is configured to predict material property conditions in an AM process and the trained fault classification module is configured to predict fault conditions based on the fused material integrity.

Figure 2B:
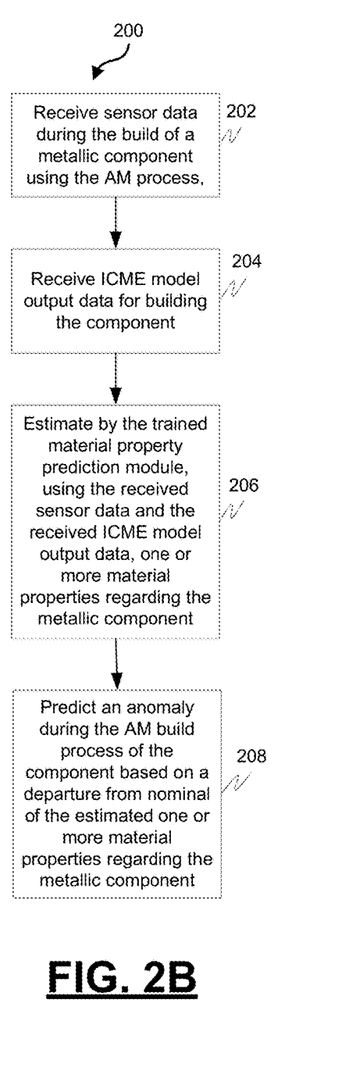
FIG. 2B is a process flow chart depicting an example computer-implemented process for predicting, in real-time, material properties and/or faults during an AM process, in accordance with some embodiments.

FIG. 2B is a process flow chart depicting an example computer-implemented process 200 for predicting, in real-time, material properties and/or faults during an Additive Manufacturing (AM) process. The order of operation within the process is not limited to the sequential execution as illustrated in the figure, but may be performed in one or more varying orders as applicable and in accordance with the present disclosure. In various embodiments, the process can be scheduled to run based on one or more predetermined events, and/or allowed to run continuously during operation of the AM process.

The example process 200 includes receiving sensor data during the build of a metallic component using the AM process (operation 202). The sensor data may include two or more of time-series temperature data of a surface of the metallic component recorded by a photodiode, time-series temperature data of a surface of the metallic component recorded by a pyrometer, time-series laser power data, time-series build chamber oxygen data, time-series build chamber humidity data, and other time-series build chamber environmental data.

The example process 200 includes receiving ICME model output data for building the component (operation 204). The ICME model output data may include predicted melt pool dimensions time-series data, predicted melt temperature time-series data, and predicted defects forming as a result of melt pool evolution and movement. The ICME model output data is predicted from an ICME model that may include as inputs laser power, laser speed, hatch spacing, and laser motion on top of a powder bed.

The example process 200 further includes estimating, using the received sensor data and the received ICME model output data, one or more material properties associated with the metallic component using a material property prediction module configured to predict one or more material properties (operation 206). The one or more material properties may include one or more of porosity size and distribution, surface roughness, and strength of a section of the melted and welded metallic component. The example material property prediction module may be implemented using a DNN. The example material property prediction module may be trained using machine learning techniques and using the techniques described with respect to process 201. The DNN may be trained using sensor data from the build of a component of the same type, ICME model output data for the build of a component of the same type, and/or post-build inspection data of a component of the same type. The material property prediction module may be implemented using a plurality of DNNs wherein each DNN of the plurality of DNNs is configured to estimate using the received sensor data and the received ICME model output data a unique material property data associated with the metallic component.

The example process 200 further includes predicting a fault or anomaly during the AM build process using a fault classification module (operation 208). The fault classification module may be configured to predict an anomaly based on a departure from nominal of the estimated one or more material properties during the AM build process. The fault classification module may be implemented using a DNN. The fault classification module may be trained using machine learning techniques and using the techniques described with respect to process 201. The DNN may be trained using sensor data from the build of a component of the same type, ICME model output data for the build of a component of the same type, and/or post-build inspection data of a component of the same type. The fault classification module may be implemented using a plurality of DNNs. The material property prediction module and the fault classification module may be implemented using the same DNN.

Figure 3A:
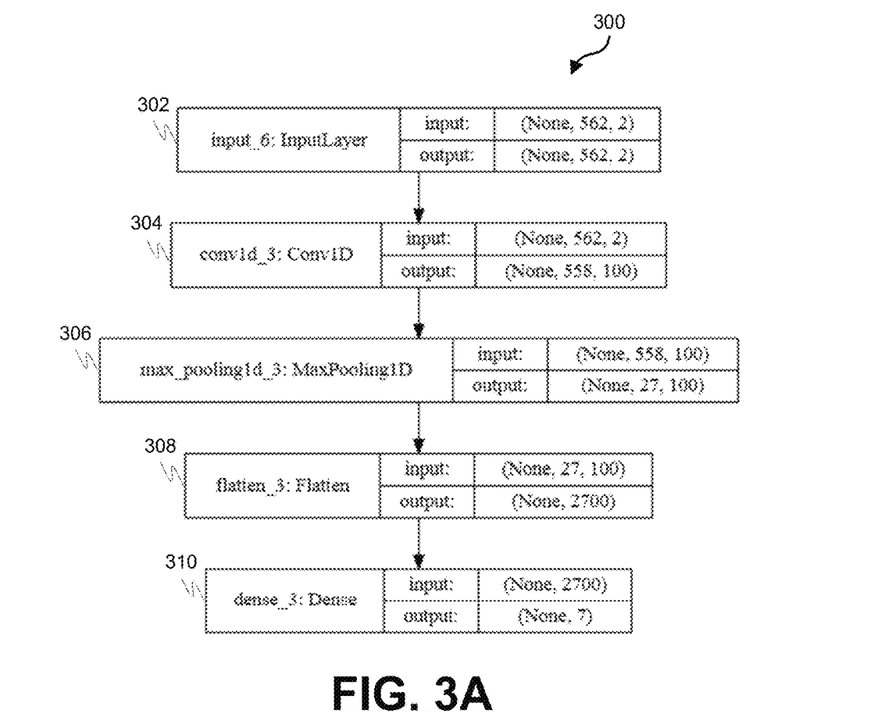
FIG. 3A is a diagram depicting an example configuration of an example Deep Neural Network (DNN) that is configured to implement a material property prediction module and a fault classification module, in accordance with some embodiments.

FIG. 3A is a diagram depicting an example configuration of an example DNN 300 that is configured to implement a material property prediction module and a fault classification module. The example DNN 300 includes an input layer 302, a one-dimensional (1D) convolutional network layer 304, a max-pooling network layer 306, a flatten network layer 308, and a dense network layer 310.

The example input layer 302 includes a 562×2 matrix with 562 temperature inputs for each of two sensors, a photodiode and a pyrometer. The example one-dimensional (1D) convolutional network layer 304 performs a one-dimensional convolution on the input matrix to yield a 558×100 output matrix. The example max-pooling network layer 306 performs a transformation of the 558×100 matrix to a 27×100 output matrix. The example flatten network layer 308 performs a transformation of the 27×100 matrix to a 2700 element vector array. The example dense network layer 310 performs a transformation of the 2700 element vector array to 7 output nodes. In this example, the value at each of the 7 output nodes is a binary value which indicates whether a fault may occur in the section in the build of the final part represented by the output node.

Figure 3B:
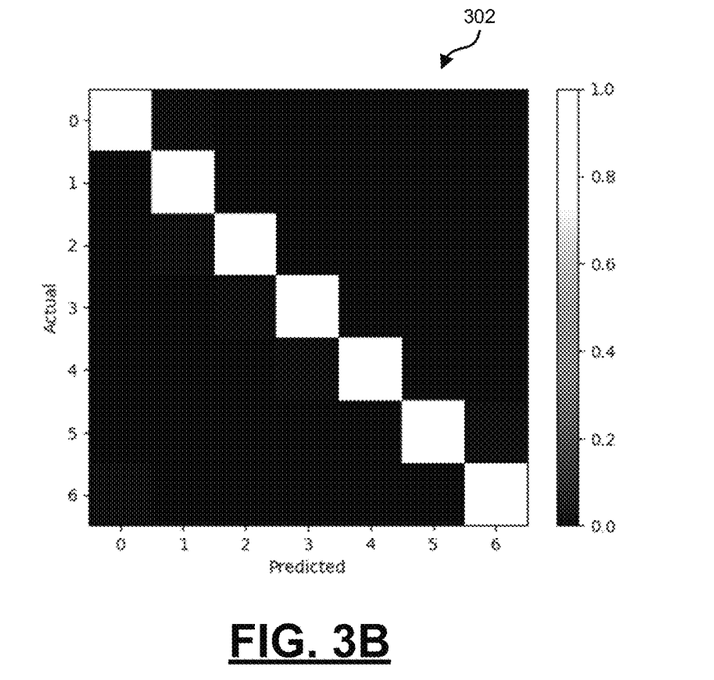
FIG. 3B is an example plot of fault predictions versus actual faults for an example DNN, in accordance with some embodiments.

FIG. 3B is an example plot 302 of fault predictions versus actual faults for the example DNN 300. The example plot illustrates the accuracy of the example DNN 300 in predicting faults using test data. The example DNN 300 provides 7 output nodes. Each of the 7 output nodes represents a different section in the build of the final part. The binary value of the output node can identify whether a fault condition exists at the region of the manufactured part represented by the output node. The example plot 302 shows that the example DNN 300 correctly predicted a fault at the melt area represented by an output node when a fault actually existed at that melt area. For example, when an actual fault existed at the melt area represented by output node 0, the example DNN predicted a fault at the melt area represented by the output node 0.

Apparatus, systems, methods, techniques and articles are described for predicting material properties in an AM process. The described apparatus, systems, methods, techniques and articles may also be used to predict, in real-time, an anomaly during the AM build process of a component.

In one embodiment, a computer-implemented method for predicting material properties in an Additive Manufacturing (AM) process is provided. The method comprises: receiving sensor data during the build of a metallic component using the AM process; receiving ICME (Integrated Computational Materials Engineering) model output data for building the component, wherein the ICME model output data includes predicted melt pool dimensions time-series data, predicted melt temperature time-series data, and predicted defects forming as a result of melt pool evolution and movement; and estimating using the received sensor data and the received ICME model output data of one or more material properties associated with the metallic component using a material property prediction module configured to predict one or more of the material properties.

These aspects and other embodiments may include one or more of the following features. The sensor data may comprise two or more of time-series temperature data of a surface of the metallic component recorded by a photodiode, time-series temperature data of a surface of the metallic component recorded by a pyrometer, time-series laser power data, time-series build chamber oxygen data, time-series build chamber humidity data, and other time-series build chamber environmental data. The material property prediction module may comprise a Deep Neural Network (DNN). The DNN may be trained using sensor data from the build of a second component, ICME model output data for the build of the second component, and post-build inspection data of the second component. The method may further comprise training the material property prediction module, wherein training the material property prediction module may comprise: collecting training data comprising sensor data from the build of a second component, ICME model output data for the build of the second component, and post-build inspection data of the second component; and computing and correcting a neural network model for the material property prediction module based on an error estimator metric to determine a final weight for each node in the neural network model. The one or more material properties may comprise one or more of porosity determination, surface roughness, and strength of a section of the metallic component. The material property prediction module may comprise a plurality of Deep Neural Networks (DNNs) wherein each DNN of the plurality of DNNs is configured to estimate using the received sensor data and the received ICME model output data a unique material property associated with the metallic component. The ICME model output data may be predicted from an ICME model that includes as inputs laser power, laser speed, hatch spacing, and laser motion on top of a powder bed. The method may further comprise predicting an anomaly during the AM build process of the component using an anomaly detection model that is configured to predict the anomaly based on a departure from nominal of the estimated one or more material properties associated with the metallic component.

In another embodiment, a computer-implemented system configured to predict material properties in an Additive Manufacturing (AM) process is provided. The system comprises: a photodiode configured to provide time-series temperature data of a surface of a metallic component during the build of the metallic component during the AM process; a pyrometer configured to provide time-series temperature data of a surface of the metallic component during the build of this component during the AM process; an ICME (Integrated Computational Materials Engineering) module configured to predict ICME model output data for building the component, wherein the ICME model output data includes predicted melt pool dimensions time-series data, predicted melt temperature time-series data, and predicted defects forming as a result of melt pool evolution and movement; and a material property prediction module configured to estimate, in real-time, during the build of the metallic component, using the time-series temperature data from the photodiode, the time-series temperature data from the pyrometer, and the ICME model output data, one or more material properties associated with the metallic component.

These aspects and other embodiments may include one or more of the following features. The material property prediction module may comprise a Deep Neural Network (DNN). The DNN may be trained using sensor data from the build of a second component, ICME model output data for the build of the second component, and post-build inspection data of the second component. The DNN may be trained through computing and correcting a neural network model for the material property prediction module based on an error metric to determine a final weight for each node in the neural network model. The one or more material properties may comprise one or more of porosity determination, surface roughness, and strength of a section of the metallic component. The material property prediction module may comprise a plurality of Deep Neural Networks (DNNs) wherein each DNN of the plurality of DNNs may be configured to estimate, using the time-series temperature data from the photodiode, the time-series temperature data from the pyrometer, and the ICME model output data, a unique material property associated with the metallic component. The ICME module may be configured to predict the ICME model output data from inputs comprising laser power, laser speed, hatch spacing, and laser motion on top of a powder bed. The system may further comprise an anomaly detection model configured to predict an anomaly during the AM build process of the component based on a departure from nominal of the estimated one or more material properties associated with the metallic component.

In another embodiment, a material property prediction module configured to predict material properties in an Additive Manufacturing (AM) process is provided. The material property prediction module comprises one or more processors configured by programming instructions in computer readable media. The material property prediction module is configured to: receive sensor data during the build of a metallic component using the AM process, wherein the sensor data includes two or more of time-series temperature data of a surface of the metallic component recorded by a photodiode, time-series temperature data of a surface of the metallic component recorded by a pyrometer, time-series laser power data, time-series build chamber oxygen data, time-series build chamber humidity data, and other time-series build chamber environmental data; receive ICME (Integrated Computational Materials Engineering) model output data for building the component, wherein the ICME model output data includes predicted melt pool dimensions time-series data, predicted melt temperature time-series data, and predicted defects forming as a result of the melt pool evolution and movement; and estimate using the received sensor data and the received ICME model output data one or more material properties associated with the metallic component.

These aspects and other embodiments may include one or more of the following features. The material property prediction module may further comprise a Deep Neural Network (DNN). The DNN may be trained using sensor data from the build of a second component, ICME model output data for the build of the second component, and post-build inspection data of the second component. The material property prediction module may further comprise a plurality of Deep Neural Networks (DNNs) wherein each DNN of the plurality of DNNs is configured to estimate, using the received sensor data and the received ICME model output data, a unique material property associated with the metallic component.

Those skilled in the art will appreciate that the various illustrative logical blocks, modules, circuits, and algorithmic steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled personnel in this art may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but as an alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps in a method or algorithm described in connection with the embodiments disclosed herein may be implemented directly within hardware, in a software module executed by a processor, or in a combination of the hardware and software. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. As an alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It should be understood that various changes may be made in the function and arrangement of elements described in an exemplary embodiment without departing from the scope of the invention as set forth in the appended claims.

What is claimed is:

1. A computer-implemented method for predicting material properties in an Additive Manufacturing (AM) process, the method comprising:
   receiving sensor data during the build of a metallic component using the AM process;
   receiving ICME (Integrated Computational Materials Engineering) model output data for building the component, the ICME model output data including predicted melt pool dimensions time-series data, predicted melt temperature time-series data, and predicted defects forming as a result of melt pool evolution and movement; and
   estimating one or more of porosity size, porosity distribution, surface roughness, residual stresses, or strength of at least a portion of the metallic component using a Deep Neural Network (DNN) by applying the received sensor data and the received ICME model output data as inputs to the DNN, wherein the DNN is trained using sensor data from the build of a second component, ICME model output data for the build of the second component, and post-build inspection data of the second component to estimate the one or more of porosity size, porosity distribution, surface roughness, residual stresses, or strength of at least a portion of the metallic component.

2. The method of claim 1, wherein the sensor data comprises two or more of time-series temperature data of a surface of the metallic component recorded by a photodiode, time-series temperature data of a surface of the metallic component recorded by a pyrometer, time-series laser power data, time-series build chamber oxygen data, time-series build chamber humidity data, and other time-series build chamber environmental data.

3. The method of claim 1, further comprising training the DNN, wherein training the DNN comprises:
   collecting training data comprising sensor data from the build of a second component, ICME model output data for the build of the second component, and post-build inspection data of the second component; and
   computing and correcting a neural network model based on an error estimator metric to determine a final weight for each node in the neural network model.

4. The method of claim 1, further comprising predicting an anomaly during the AM build process of the component using the DNN.

5. The method of claim 1, wherein the estimating one or more of porosity size, porosity distribution, surface roughness, residual stresses, or strength of at least a portion of the metallic component comprises estimating the one or more of porosity size, porosity distribution, surface roughness, residual stresses, or strength of at least a portion of the metallic component using a plurality of DNNs wherein each DNN of the plurality of DNNs is configured to estimate using the received sensor data and the received ICME model output data a unique one of porosity size, porosity distribution, surface roughness, residual stresses, or strength of at least a portion of the metallic component.

6. The method of claim 1, wherein the ICME model output data is predicted from an ICME model that includes as inputs laser power, laser speed, hatch spacing, and laser motion on top of a powder bed.

7. The method of claim 1, further comprising predicting an anomaly during the AM build process of the component using an anomaly detection model that is configured to predict the anomaly based on a departure from nominal of the estimated one or more of porosity size, porosity distribution, surface roughness, residual stresses, or strength of at least a portion of the metallic component output from the DNN.

8. A computer-implemented system configured to predict material properties in an additive manufacturing (AM) process, the system comprising:
   a photodiode configured to provide time-series temperature data of a surface of a metallic component during the build of the metallic component during the AM process;
   a pyrometer configured to provide time-series temperature data of a surface of the metallic component during the build of the metallic component during the AM process;
   an ICME (Integrated Computational Materials Engineering) module configured to predict ICME model output data for building the component, the ICME model output data including predicted melt pool dimensions time-series data, predicted melt temperature time-series data, and predicted defects forming as a result of melt pool evolution and movement; and
   a Deep Neural Network (DNN) trained to estimate, in real-time, during the build of the metallic component, using the time-series temperature data from the photodiode, the time-series temperature data from the pyrometer, and the ICME model output data as inputs to the DNN, one or more of porosity size, porosity distribution, surface roughness, residual stresses, or strength of at least a portion of the metallic component.

9. The system of claim 8, wherein the DNN is trained using sensor data from the build of a second component, ICME model output data for the build of the second component, and post-build inspection data of the second component to estimate the one or more of porosity size, porosity distribution, surface roughness, residual stresses, or strength of at least a portion of the metallic component.

10. The system of claim 8, wherein the DNN is trained through computing and correcting a neural network model based on an error estimator metric to determine a final weight for each node in the neural network model.

11. The system of claim 8, wherein the DNN is further trained to predict an anomaly during the AM build process of the component.

12. The system of claim 8, comprising a plurality of Deep Neural Networks (DNNs) wherein each DNN of the plurality of DNNs is configured to estimate, using the time-series temperature data from the photodiode, the time-series temperature data from the pyrometer, and the ICME model output data, a unique one of porosity size, porosity distribution, surface roughness, residual stresses, or strength of at least a portion of the metallic component.

13. The system of claim 8, wherein the ICME module is configured to predict the ICME model output data from inputs comprising laser power, laser speed, hatch spacing, and laser motion on top of a powder bed.

14. The system of claim 8, further comprising an anomaly detection model configured to predict an anomaly during the AM build process of the component based on a departure from nominal of the estimated one or more of porosity size, porosity distribution, surface roughness, residual stresses, or strength of at least a portion of the metallic component output from the DNN.

15. A material property prediction module configured to predict material properties in an Additive Manufacturing (AM) process, the material property prediction module comprising one or more processors configured by programming instructions in computer readable media, the material property prediction module configured to:
   receive sensor data during the build of a metallic component using the AM process, the sensor data including two or more of time-series temperature data of a surface of the metallic component recorded by a photodiode, time-series temperature data of a surface of the metallic component recorded by a pyrometer, time-series laser power data, time-series build chamber oxygen data, time-series build chamber humidity data, and other time-series build chamber environmental data;
   receive ICME (Integrated Computational Materials Engineering) model output data for building the component, the ICME model output data including predicted melt pool dimensions time-series data, predicted melt temperature time-series data, and predicted defects forming as a result of melt pool evolution and movement; and
   estimate one or more of porosity size, porosity distribution, surface roughness, residual stresses, or strength of at least a portion of the metallic component using a Deep Neural Network (DNN) by applying the received sensor data and the received ICME model output data as inputs to the DNN.

16. The material property prediction module of claim 15, wherein the ICME model output data is predicted from an ICME model that includes as inputs laser power, laser speed, hatch spacing, and laser motion on top of a powder bed.

17. The material property prediction module of claim 15, wherein the DNN is further trained to predict an anomaly during the AM build process of the component.

18. The material property prediction module of claim 15, further comprising a plurality of Deep Neural Networks (DNNs), wherein each DNN of the plurality of DNNs is configured to estimate using the received sensor data and the received ICME model output data a unique one of porosity size, porosity distribution, surface roughness, residual stresses, or strength of at least a portion of the metallic component.

19. The material property prediction module of claim 15, wherein the DNN is trained through computing and correcting a neural network model based on an error estimator metric to determine a final weight for each node in the neural network model.

20. The material property prediction module of claim 15, wherein the DNN is trained using sensor data from the build of a second component, ICME model output data for the build of the second component, and post-build inspection data of the second component to predict the one or more of porosity size, porosity distribution, surface roughness, residual stresses, or strength of at least a portion of the metallic component.

* * * * *